July 19, 1966  E. A. ROTHMAN  3,261,228
DISK FRAGMENT ENERGY ABSORPTION AND CONTAINMENT MEANS
Filed April 2, 1964  2 Sheets-Sheet 2
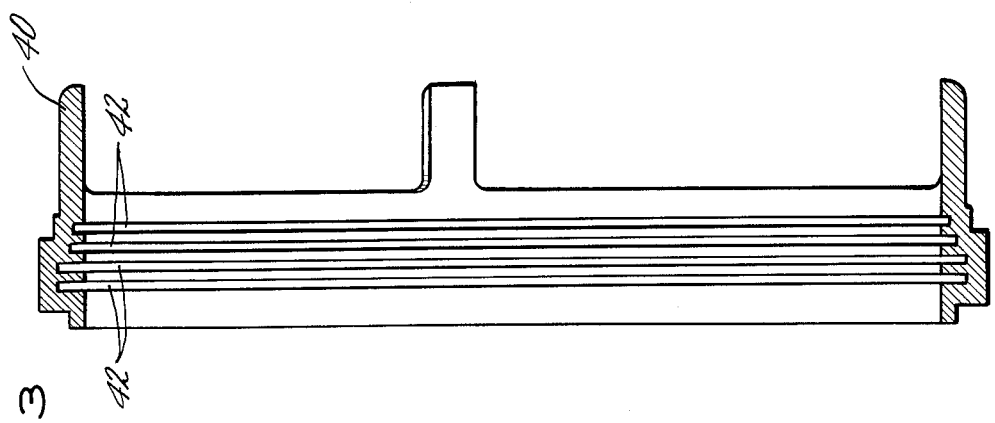
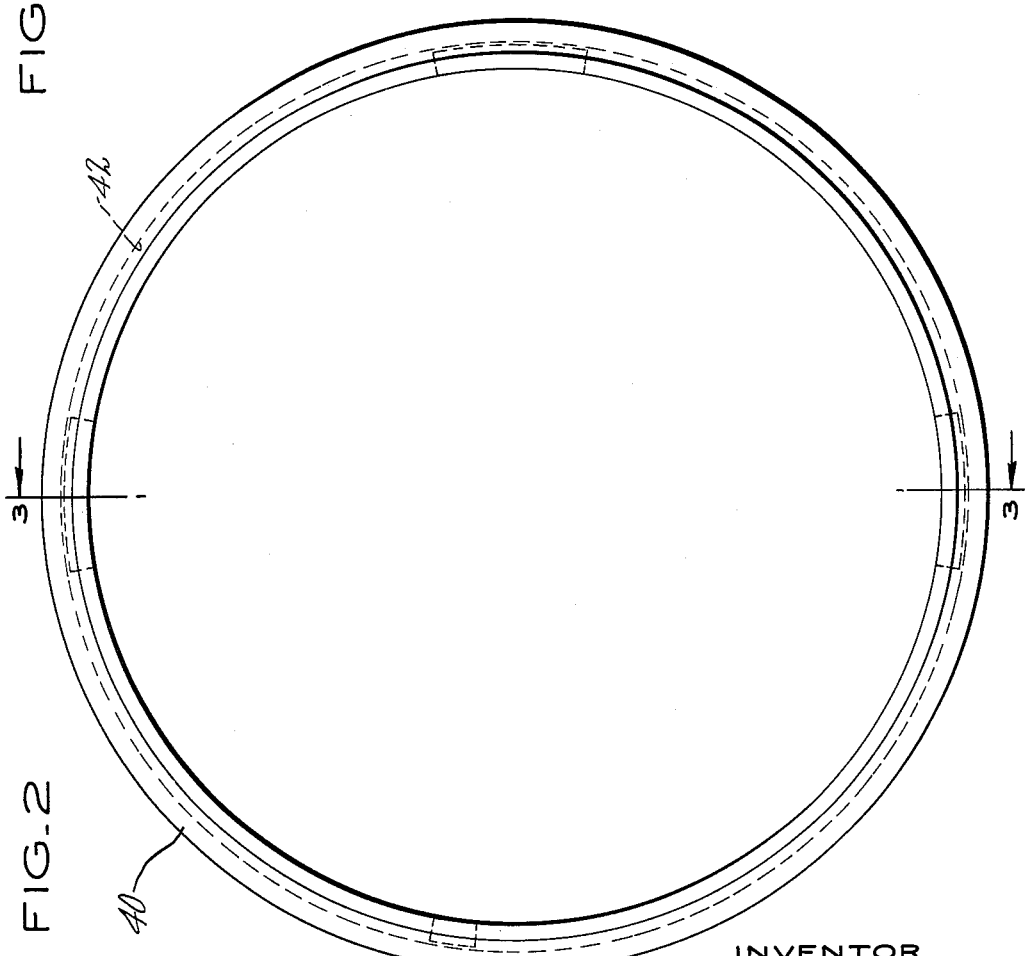
INVENTOR
EDWARD A. ROTHMAN
BY Norman Friedland
ATTORNEY 3,261,228
DISK FRAGMENT ENERGY ABSORPTION AND
CONTAINMENT MEANS
Edward A. Rothman, Glastonbury, Conn., assignor to
United Aircraft Corporation, East Hartford, Conn., a
corporation of Delaware
Filed Apr. 2, 1964, Ser. No. 356,848
3 Claims. (Cl. 74—609)

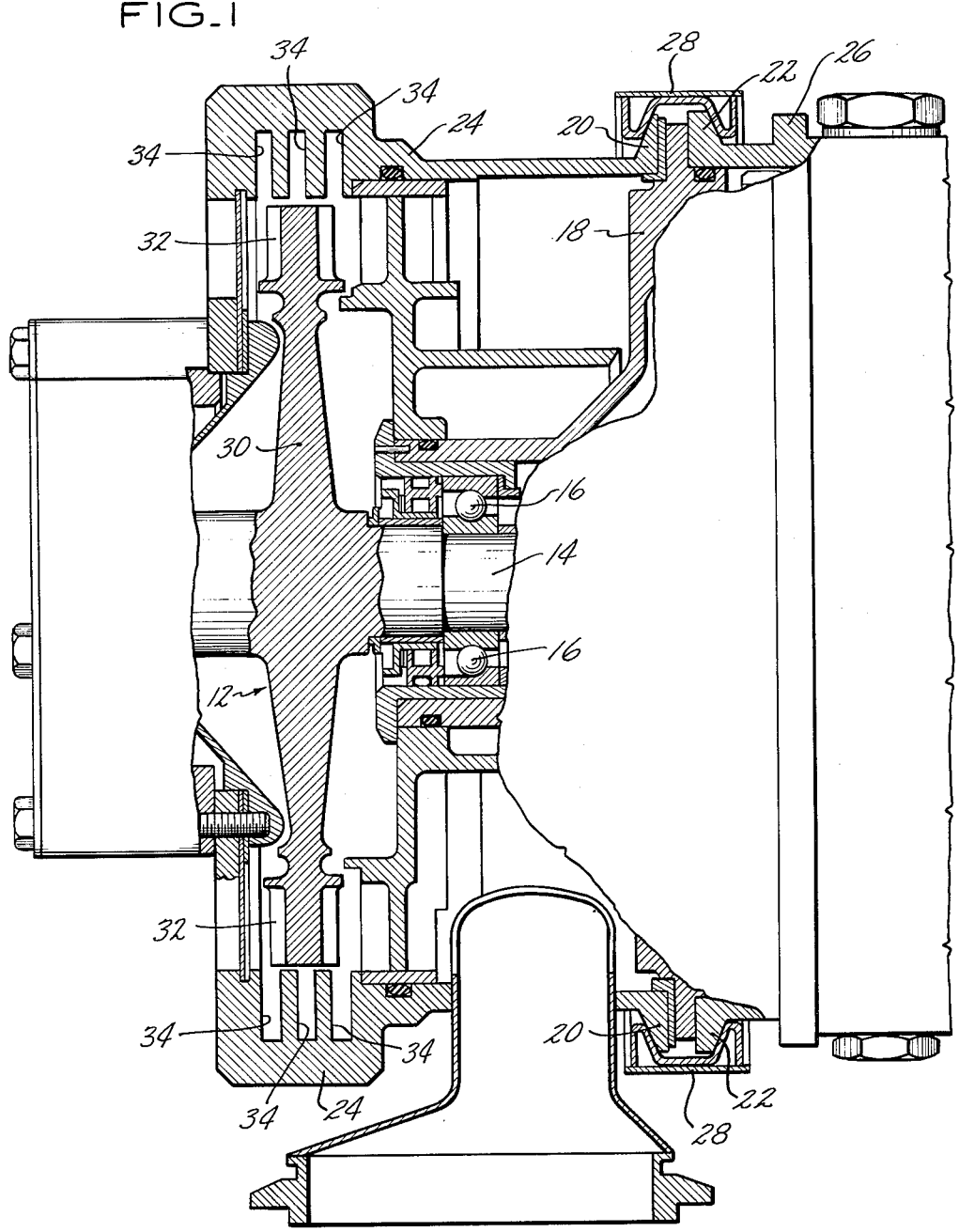

This invention relates to means for restraining and containing movable particles that have become disassociated from a rotating member.

As is generally well-known in the art, the internal forces created within a rotating body may become sufficiently large to overcome the structural integrity of that body. Generally, bursting of the rotating mass will occur as a result of an overspeed or exceeding the fatigue life of the body. Upon bursting, the dislodged particle or fragment obviously having a great deal of energy, impinges with a large force upon contacting adjacent members in the assembly. Frequently the force of impact is sufficiently large to cause the supporting structural housing to fracture ultimately allowing fragments to scatter in the surrounding environment. Obviously, it is possible to prevent the housing from breaking by making it sufficiently strong by "beefing" it up to withstand the impact forces of the fragment. Of course this would permit ricochet, abrupt energy transfer and increase the size and weight of the device.

I have found that I can reduce impulsive energy transfer and prevent the fragment from escaping by providing a grooved ring mounted adjacent to the outer periphery of the rotating member. The ring contains a series of grooves spanning the width of the rotating part which grooved ring serves to act as a workpiece while the fragment acts as a cutting tool working against the workpiece. In this manner the fragment dissipates and transfers its energy, its movement is restrained and becomes contained by the ring without substantially increasing the weight of the rotating machinery.

It is, therefore, an object of this invention to provide a grooved member surrounding a rotating device for restraining and containing particles that may dislodge from a rotating member.

It is still a further object of this invention to provide means for containing and restraining movement of a dislodged particle for rotating machine which means is characterized as being relatively economical and simple to manufacture and assemble.

Other features and advantages will be apparent from the specification and claims and from the accompanying drawings which illustrate an embodiment of the invention.

FIG. 1 is partially a schematic and partially a section illustrating a turbine and the invention wherein the grooves are formed in the inner diameter of the housing of the machine.

FIG. 2 is a side elevation of a grooved ring.

FIG. 3 is a section taken along line 3—3 of FIG. 2.

Referring now particularly to FIG. 1 which shows a turbine driven machine generally indicated by numeral 10, the turbine 12 carries an integral rearwardly extending shaft 14 which is supported by suitable bearings indicated generally by numeral 16. The bearings may be suitably supported by bulkhead member 18 which is in turn secured at its outward end to the flanges 20 and 22 formed on the opposing ends of the turbine housing members 24 and 26 respectively. The two casing members may be suitably connected by member 28. The turbine comprises a rotor 30 and a plurality of turbine buckets 32 integrally formed at the outer periphery of the rotor. The section of the rotor adjacent the buckets may be undercut or fused in order to become the point at which the break will occur in the event of a malfunction of the turbine wheel. This is done for the purpose of locating the breaking point at the most desirable point should a break occur.

According to the present invention a plurality of parallel spaced grooves 34 are formed on the inner diameter of the forward casing member 24. The grooves may be so spaced that they span a distance that is equal to the largest width of the particle that will become separated in the event of a malfunction. The depth of the grooves is selected by preascertaining the size of the fragment but obviously sufficient material must remain which would oppose the momentum of the disassociated particle.

From the drawing it will be appreciated that the grooves lie in a plane including the plane of rotation of the turbine. When the turbine particle separates, it immediately contacts and cuts into the inner boundary of the ribs. As the particle continues its travel, it cuts progressively into the ribs thereby dissipating some energy and transferring the remaining energy to the grooved ring in a progressive, continuous manner. As it continues to cut off the ribs the remaining ribs and the back of the casing define a channel. This channel serves to eliminate ricochet and permanently hold the broken particle or particles as the case may be.

While FIG. 1 shows the grooves formed within the turbine housing, it is also contemplated within the scope of this invention that the containment and energy absorbing member may be made in a separate ring which can be adapted to fit into the rotating machine. In mounting such a ring, the ring must surround and be in the same plane as the rotating machinery as is the case of the structure shown in FIG. 1.

Referring particularly to FIGS. 2 and 3 which show a circular ring 40 having a plurality of parallel spaced grooves 42 formed on its inner diameter. The ring may contain a plurality of rearwardly extending mounting tabs 44. Although not shown, these tabs are secured to the housing for holding the ring in position relative to the rotating machine.

What has been shown by this invention is a simple device which is adapted to progressively absorb the energy of a fragment separated from a rotating machine and contain the fragment so as to prevent it from escaping from the machine.

By virtue of this invention, it is possible to accomplish this feature without substantially increasing the overall weight of the machine or substituting more expensive material that would otherwise have to be utilized. When a fragment separates from the rotating machinery due to its radial and tangential forces, it would immediately upon contact with the ribs extended between the grooves, tend to cut into the ribs. Due to the tangential momentum, the fragment would tend to follow a circumferential path biting progressively and continuously into the extending ribs. In this manner, the fragment dissipates and transfers its energy until it comes to a stop while the remaining channel cut by the fragment restrains said fragment.

While this invention was described in connection with a turbine driven device, it will be appreciated and readily understood by those skilled in the art that this containment means could be utilized with any type of rotating mechanism.

It should be understood that the invention is not limited to the particular embodiments shown and described herein, but that various changes and modifications may be made without departing from the spirit or scope of this novel concept as defined by the following claims.

I claim:

1. In a rotating machine having a rotating member, said member carrying an element adapted to separate therefrom when subjected to a predetermined load, means for restraining and containing said element when it has become disassociated from said rotating member comprising an annular member surrounding and lying in the plane of rotation of said rotating member, a plurality of annular grooves in said annular member dimensioned to extend in depth a distance defined by the dimension of said element, said grooves extending in width a distance spanning said element to define a channel to contain said disassociated element when spent upon by removal of the material between said annular grooves by said disassociated element.

2. A high speed rotary unit comprising a rotor having a plurality of peripherally spaced members located on the outer perihery thereof, said members being elongated and separated from each other at a predetermined distance, said members being susceptible to rupturing and having fragments separate from the rotor, a casing surrounding said rotor, an annular member integral with or within the inner surface of said casing, said member having a dimension along the axis of rotation at least as extensive as the width of said rotor members in a direction along said axis of rotation to accommodate the separated fragment, said annular member containing at least one protrusion extending inward toward the axis of rotation to a radius adjacent to the outer ends of said rotor members, but being spaced therefrom, said protrusion and said annular member comprising an elastically and plastically deformable mass of material extending in an annular direction and of sufficient size to form a deformable barrier whose energy absorption during deformation is sufficient to decelerate said separated fragment of said rotor members which separate from the rotor during rupture.

3. A high speed rotary unit comprising a rotor, having a plurality of peripherally spaced members connected to the rotor, said members being elongated and separated from each other at a predetermined distance, said members being susceptible to rupturing at a predetermined point, a casing surrounding said rotor, an annular member integral with or within the inner surface of said casing in substantial alignment with said rotor, said annular members having a dimension along the axis of rotation at least as extensive as the width of said rotor members in a direction along said axis, said annular member containing a plurality of annular protrusions extending inward from the wall of said annular members toward the axis of rotation to a radius adjacent to the outer ends of said rotor members, but being spaced therefrom, the dimension thereof being determined by the location of said predetermined point on said member, said protrusions having sufficient total energy absorbing capability to act as a decelerator for said rotor members following a rupture, some portion of said energy absorbing capability ensuing from a machining away of said protrusions by said rotor members following rupture, said machining resulting in a channel to trap said rotor members when their energy is spent preventing ricochet.

References Cited by the Examiner

UNITED STATES PATENTS

| | | | |
|---|---|---|---|
| 1,251,251 | 12/1917 | Lindeberg | 74—609 |
| 1,698,514 | 1/1929 | Schmidt | 74—609 |
| 2,879,936 | 3/1959 | Faught | 253—77 |
| 2,987,296 | 6/1961 | Ferguson | 253—77 |

MILTON KAUFMAN, *Primary Examiner.*

BROUGHTON G. DURHAM, *Examiner.*

W. S. RATLIFF, *Assistant Examiner.*